United States Patent
Hoff et al.

(10) Patent No.: US 10,650,512 B2
(45) Date of Patent: May 12, 2020

(54) SYSTEMS AND METHODS FOR TOPOGRAPHICAL CHARACTERIZATION OF MEDICAL IMAGE DATA

(71) Applicant: THE REGENTS OF THE UNIVERSITY OF MICHIGAN, Ann Arbor, MI (US)

(72) Inventors: Benjamin A. Hoff, Ann Arbor, MI (US); Craig Galban, Ann Arbor, MI (US); Brian D. Ross, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 120 days.

(21) Appl. No.: 15/623,151

(22) Filed: Jun. 14, 2017

(65) Prior Publication Data

US 2017/0358078 A1    Dec. 14, 2017

Related U.S. Application Data

(60) Provisional application No. 62/349,985, filed on Jun. 14, 2016.

(51) Int. Cl.
*G06T 7/00* (2017.01)
*G06T 7/60* (2017.01)
*G06T 7/11* (2017.01)

(52) U.S. Cl.
CPC .............. *G06T 7/0012* (2013.01); *G06T 7/11* (2017.01); *G06T 7/60* (2013.01); *G06T 2207/10081* (2013.01); *G06T 2207/30061* (2013.01)

(58) Field of Classification Search
None
See application file for complete search history.

(56) References Cited

U.S. PATENT DOCUMENTS

| | | |
|---|---|---|
| 6,163,152 A | 12/2000 | Bernstein et al. |
| 6,381,296 B1 | 4/2002 | Nishiura |
| (Continued) | | |

FOREIGN PATENT DOCUMENTS

| | | |
|---|---|---|
| WO | WO-2001/56466 A2 | 8/2001 |
| WO | WO-2002/061457 A2 | 8/2002 |
| (Continued) | | |

OTHER PUBLICATIONS

Arns, Christoph H., et al. "Computation of linear elastic properties from microtomographic images: Methodology and agreement between theory and experiment." Geophysics 67.5 (2002): 1396-1405. (Year: 2002).*

(Continued)

*Primary Examiner* — Tahmina N Ansari
(74) *Attorney, Agent, or Firm* — Marshall, Gerstein & Borun LLP

(57) ABSTRACT

Computer-implemented methods are used to analyze a medical image to assess the state of the sample region. In at least one embodiment, the method comprises receiving at least one medical image collected previously from an image source, the at least one medical image comprising a plurality of voxels, each characterized by a signal value; classifying the signal value of each voxel as representing one of healthy tissue or diseased tissue based on a threshold value; and analyzing at least one topographical feature of the at least one medical image.

20 Claims, 6 Drawing Sheets

(56) References Cited

U.S. PATENT DOCUMENTS

| | | | |
|---|---|---|---|
| 6,567,684 | B1 | 5/2003 | Chenevert et al. |
| 6,579,240 | B2 | 6/2003 | Bjaerum et al. |
| 6,845,342 | B1 | 1/2005 | Basser et al. |
| 6,901,277 | B2 | 5/2005 | Kaufman et al. |
| 6,969,991 | B2 | 11/2005 | Bammer et al. |
| 7,078,897 | B2 | 7/2006 | Yablonskiy et al. |
| 7,897,792 | B2 | 3/2011 | Iikura et al. |
| 7,949,164 | B2 | 5/2011 | Degani et al. |
| 8,185,186 | B2 | 5/2012 | Ross et al. |
| 9,053,534 | B2* | 6/2015 | Ross ............ G06T 7/0012 |
| 9,773,311 | B2* | 9/2017 | Ross ............ G06T 7/0016 |
| 2003/0018245 | A1 | 1/2003 | Kaufman et al. |
| 2003/0065260 | A1 | 4/2003 | Cheng et al. |
| 2004/0254444 | A1 | 12/2004 | Bittner |
| 2005/0105788 | A1 | 5/2005 | Turek et al. |
| 2007/0036410 | A1 | 2/2007 | Ida et al. |
| 2007/0053560 | A1 | 3/2007 | Miller et al. |
| 2007/0060799 | A1 | 3/2007 | Lyon et al. |
| 2007/0081704 | A1 | 4/2007 | Pan et al. |
| 2008/0021301 | A1 | 1/2008 | Gonzalez et al. |
| 2008/0219530 | A1 | 9/2008 | Levanon et al. |
| 2009/0035218 | A1 | 2/2009 | Ross et al. |
| 2009/0234237 | A1 | 2/2009 | Ross et al. |
| 2009/0058417 | A1 | 3/2009 | Yanasak et al. |
| 2009/0232378 | A1 | 9/2009 | Nakamura |
| 2010/0088339 | A1 | 4/2010 | Rietzel et al. |
| 2010/0160764 | A1 | 6/2010 | Steinberg et al. |
| 2010/0172556 | A1 | 7/2010 | Cohen et al. |
| 2010/0249099 | A1 | 9/2010 | Rewcastle et al. |
| 2010/0254584 | A1 | 10/2010 | Gulsun et al. |
| 2011/0009405 | A1 | 1/2011 | Rewcastle et al. |
| 2011/0053907 | A1 | 3/2011 | Rewcastle et al. |
| 2011/0066024 | A1 | 3/2011 | Shih et al. |
| 2011/0077503 | A1 | 3/2011 | Bonilha et al. |
| 2011/0187367 | A1 | 8/2011 | Feiweier et al. |
| 2011/0280457 | A1 | 11/2011 | Nielsen et al. |
| 2012/0288173 | A1 | 11/2012 | Rai et al. |
| 2012/0316422 | A1 | 12/2012 | Ross et al. |
| 2013/0004043 | A1* | 1/2013 | Ross ............ G06T 7/0016 382/131 |
| 2013/0004044 | A1* | 1/2013 | Ross ............ G06T 7/0016 382/131 |
| 2013/0129168 | A1 | 5/2013 | Ross |
| 2013/0308849 | A1 | 11/2013 | Fei et al. |
| 2017/0358078 | A1* | 12/2017 | Hoff ............ G06T 7/0012 |

FOREIGN PATENT DOCUMENTS

| | | |
|---|---|---|
| WO | WO-2008/122056 A2 | 10/2008 |
| WO | WO-2008/154741 A1 | 12/2008 |
| WO | WO-2010/116124 A1 | 10/2010 |
| WO | WO-2011/137370 A2 | 11/2011 |
| WO | WO-2013/003826 A1 | 1/2013 |
| WO | WO-2013/006506 A1 | 1/2013 |
| WO | WO-2013/078370 A1 | 5/2013 |
| WO | WO-2013/166416 A1 | 11/2013 |

OTHER PUBLICATIONS

Bagrodia et al., Mechanisms of intrinsic and acquired resistance to kinase-targeted therapies, Pigment Cell Melanoma Res., 25(6):819-31 (2012).

Baines et al., Inhibition of Ras for cancer treatment: the search continues, Future Med. Chem., 3(14):1787-808 (2011).

Bammer et al., Analysis and generalized correction of the effect of spatial gradient field distortions in diffusion weighted imaging, Magn. Res. Med, 50:560-9 (2003).

Bammer et al., Assessment of spatial gradient field distortion in diffusion-weighted imaging, ISMRM Proceedings (2002).

Besl et al., A method for registration of 3-D shapes, IEEE Trans. Pattern Analysis and Machine Intelligence, 14(2):239-56 (1992).

Bing et al., Voxel-by-voxel functional diffusion mapping for early evaluation of breast cancer treatment, Information Processing in Medical Imaging, pp. 276-287 (2009).

Bookstein et al., Principal Warps: Thin-plate splines and the decomposition of deformations, IEEE Transactions on Pattern Analysis and Machine Intelligence, 11(6):567-85 (1989).

Breen et al., Three-dimensional method for comparing in vivo interventional MR images of thermally ablated tissue with tissue response, J. Magn. Reson. Imaging, 18(1):90-102 (2003).

Brix et al., Microcirculation and microvasculature in breast tumors: pharmacokinetics analysis of dynamic MR image series, Mag. Reson. Med., 52:420-9 (2004).

Brix et al., Pharmacokinetic parameters in CNS Gd-DTPA enhanced MR imaging, J. Comput Assist. Tomogr., 15:621-8 (1991).

Bubley et al., Eligibility and response guidelines for phase II clinical trials in androgen-independent prostate cancer: recommendations from the Prostate-Specific Antigen Working Group, J. Clin. Oncol., 17(11):3461-7 (1999).

Bulinski et al., Overexpression of MAP4 inhibits organelle motility and trafficking in vivo, J. Cell Sci., 110(Pt. 4):3055-64 (1997).

Cao et al., Survival prediction in high-grade gliomas by MRI perfusion before and during early stage of RT, Int. J. Radiat. Oncol. Biol. Phys., 64:876-85 (2006).

Carracedo et al., Inhibition of mTORC1 leads to MAPK pathway activation through a PI3K-dependent feedback loop in human cancer, J. Clin Invest., 118(9):3065-74 (2008).

Castellano et al., RAS Interaction with PI3K: More Than Just Another Effector Pathway, Genes Cancer, 2(3):261-74 (2011).

Chan et al., Survival and failure patterns of high-grade gliomas after three-dimensional conformal radiotherapy, J. Clin. Oncol., 20:1635-42 (2002).

Chenevert et al., Diffusion coefficient measurement using a temperature-controlled fluid for quality control in multicenter studies, J. Magn. Reson. Imaging, 34(4):983-7 (2011).

Chenevert et al., Diffusion magnetic resonance imaging: an early surrogate marker of therapeutic efficacy in brain tumors, J. Natl. Cancer Inst., 92(24):2029-36 (2000).

Chenevert et al., Diffusion MRI: a new strategy for assessment of cancer therapeutic efficacy, Mol. Imaging, 1(4):336-43 (2002).

Chenevert et al., Icewater for quality control of diffusion measurements in multi-center trials, in Proceedings of the 19th Annual Meeting of ISMRM, Montreal, Quebec, Canada, p. 912 (2011).

Chenevert et al., Monitoring early response of experimental brain tumors to therapy using diffusion magnetic resonance imaging, Clin. Cancer Res., 3(9):1457-66 (1997).

Collignon et al., 3D multi-modality medical image registration using feature space clustering, Lecture Notes in Computer Science, 905:195-204 (1995).

Degani, Mapping pathophysiological features of breast tumors by MRI at high spatial resolution, Nat. Med., 3:780-2 (1997).

Dhermain et al., Advanced MRI and PET imaging for assessment of treatment response in patients with gliomas, The Lancet Neurology, 9(9):906-20 (2010).

Early Breast Cancer Trialists Collaborative Group, Polychemotherapy for early breast cancer: an overview of the randomised trials, The Lancet, 352:930-42 (1998).

Eda et al., The relations between expiratory chest CT using helical CT and pulmonary function tests in emphysema, Am. J. Respir. Crit Care Med., 155(4):1290-4 (1997).

Ellingson et al., Volumetric analysis of functional diffusion maps is a predictive imaging biomarker for cytotoxic and anti-angiogenic treatments in malignant gliomas, J. Neuro-Oncol., 102(1):95-103 (2010).

Engelman et al., Effective use of PI3K and MEK inhibitors to treat mutant Kras G12D and PIK3CA H1047R murine lung cancers, Nat. Med., 14(12):1351-6 (2008).

European Search Report from Application No. 08745653.9 dated Feb. 26, 2013.

Evelhoch et al., Applications of magnetic resonance in model systems: cancer therapeutics, Neoplasia, 2(1-2):152-65 (2000).

Eyal et al., Model-based and model-free parametric analysis of breast dynamic-contrast-enahnced MRI, NMR Biomed., 22:40-53 (2007).

(56) References Cited

OTHER PUBLICATIONS

Falchook et al., Activity of the oral MEK inhibitor trametinib in patients with advanced melanoma: a phase 1 dose-escalation trial, Lancet Oncol., 13(8):782-9 (2012).
Fogelman et al., Positron emission tomography and bone metastases, Semin. Nucl. Med., 35(2):135-42 (2005).
Galban et al., A feasibility study of parametric response map analysis of diffusion-weighted magnetic resonance imaging scans of head and neck cancer patients for providing early detection of therapeutic efficacy, Translational Oncol., 2:184-90 (2009).
Galban et al., Prospective analysis of parametric response map-derived MRI biomarkers: identification of early and distinct glioma response patterns not predicted by standard radiographic assessment, Clin. Cancer Res., 17(14):4751-60 (2011).
Galban et al., The parametric response map is an imaging biomarker for early cancer treatment outcome, Nature Medicine, 15(5):572-6 (2009).
Galbraith et al., Reproducibility of dynamic contrast-enhanced MRI in human muscle and tumours: comparison of quantitative and semi-quantitative analysis, NMR Biomed., 15:132-42 (2002).
Galons et al., Early increases in breast tumor xenograft water mobility in response to paclitaxel therapy detected by non-invasive diffusion magnetic resonance imaging, Neoplasia, 1(2):113-7 (1999).
Gevenois et al., Comparison of computed density and macroscopic morphometry in pulmonary emphysema, Am. J. Respir. Crit. Care Med., 152(2):653-7 (1995).
Gevenois et al., Comparison of computed density and microscopic morphometry in pulmonary emphysema, Am. J. Respir. Crit. Care Med., 154(1):187-92 (1996).
Gorbunova et al., Early detection of emphysema progression, Med. Image Comput. Comput. Assist. Interv., 13(Pt. 2):193-200 (2010).
Gorbunova et al., Weight preserving image registration for monitoring disease progression in lung CT, Medical Image Computing and Computer-Assisted Intervention A MICCAI 2008, pp. 863-870 (2008).
Green et al., Multi-scale rigid registration to detect damage in micro-CT images of progressively loaded bones, 2011 8th IEEE International Symposium on Biomedical Imaging: From Nano to Micro, IEEE, pp. 1231-1234 (2011).
Hall et al., Therapeutic efficacy of DTI-015 using diffusion magnetic resonance imaging as an early surrogate marker, Clin. Cancer Res., 10(23):7852-9 (2004).
Hamaoka et al., Bone imaging in metastatic breast cancer, J. Clin. Oncol., 22(14):2942-53 (2004).
Hamstra et al., Evaluation of the functional diffusion map as an early biomarker of time-to-progression and overall survival in high-grade glioma, Proc. Natl. Acad. Sci. USA, 102(46):16759-64 (2005).
Hamstra et al., Functional diffusion map as an early imaging biomarker for high-grade glioma: correlation with conventional radiologic response and overall survival, J. Clin. Oncol., 26(20):3387-94 (2008).
Hamstra et al., The use of 19F spectroscopy and diffusion-weighted MRI to evaluate differences in gene-dependent enzyme prodrug therapies, Mol. Ther., 10(5):916-28 (2004).
Hatzivassiliou et al., RAF inhibitors prime wild-type RAF to activate the MAPK pathway and enhance growth, Nature, 464(7287):431-5 (2010).
Hayward et al., Assessment of response to therapy in advanced breast cancer (an amendment), Br. J. Cancer, 38(1):201 (1978).
Hayward et al., Assessment of response to therapy in advanced breast cancer, Br. J. Cancer, 35(3):292-8 (1977).
Helen et al., Segmentation of pulmonary parenchyma in CT lung images based on 2D Otsu optimized by PSO, Emerging Trends in Electrical and Computer Technology, 2011 International Conference on IEEE, pp. 536-541 (2011).
Hoffmann, Pharmacokinetic mapping of the breast: a new method for dynamic MR mammography, Magn. Reson. Med., 33:506-14 (1995).
Hogg et al., The nature of small-airway obstruction in chronic obstructive pulmonary disease, N. Engl. J. Med., 350(26):2645-53 (2004).
Hu et al., Automatic lung segmentation for accurate quantitation of volumetric X-ray CT images, IEEE Trans. Med. Imaging, 20(6):490-8 (2001).
Hylton, Dynamic contrast-enhanced magnetic resonance imaging as an imaging biomarker, J. Clin. Oncol., 24:3293-8 (2006).
Infante et al., Safety, pharmacokinetic, pharmacodynamic, and efficacy data for the oral MEK inhibitor trametinib: a phase 1 dose-escalation trial, Lancet Oncol., 13(8):773-81 (2012).
International Preliminary Report on Patentability, corresponding international application No. PCT/US12/45144, dated Jan. 7, 2014.
International Search Report and Written Opinion from PCT/US2012/045144 dated Oct. 4, 2012.
International Search Report and Written Opinion, PCT/US2012/066338, dated Mar. 11, 2013.
Jacobs et al., Registration and warping of magnetic resonance images to histological sections, Med. Phys., 26(8):1568-78 (1999).
Janke et al., Use of spherical harmonic deconvolution methods to compensate for nonlinear gradient effects on MRI images, Magn. Reson. Med., 52(1):115-22 (2004).
Jemal et al., Cancer statistics, 2010, CA Cancer J. Clin., 60(5):277-300 (2010).
Jennings et al., Early response of prostate carcinoma xenografts to docetaxel chemotherapy monitored with diffusion MRI, Neoplasia, 4(3):255-62 (2002).
Jordan et al., Dynamic contrast-enhanced and diffusion MRI show rapid and dramatic changes in tumor microenvironment in response to inhibition of HIF-1alpha using PX-478, Neoplasia, 7(5):475-85 (2005).
Kalikin et al., In vivo visualization of metastatic prostate cancer and quantitation of disease progression in immunocompromised mice, Cancer Biol. Ther., 2(6):656-60 (2003).
Karreth et al., C-RAF inhibits MAPK activation and transformation by B-Raf(V600E), Mol. Cell, 36(3):477-86 (2009).
Kiesling et al., "Contrast agents and applications to assess tumor angiogenesis in vivo by magnetic resonance imaging," Curr. Med. Chem., 14:77-91 (2007).
Kim et al., Correction of local deformations in fMRI by 3D non-linear warping in map-slice-to-volume approach, Proc. Intl. Soc. Mag. Reson. Med., 8:1765 (2000).
Kim et al., CT metrics of airway disease and emphysema in severe COPD, Chest., 136(2):396-404 (2009).
Kim et al., Mutual information for automated unwarping of rat brain autoradiographs, Neuroimage, 5(1):31-40 (1997).
Kim et al., Phase II study of the MEK1/MEK2 inhibitor Trametinib in patients with metastatic BRAF-mutant cutaneous melanoma previously treated with or without a BRAF inhibitor, J. Clin. Oncol., 31(4):482-9 (2013).
Kubo et al., Expiratory and inspiratory chest computed tomography and pulmonary function tests in cigarette smokers, Eur. Respir. J., 13(2):252-6 (1999).
Latour et al., Time-dependent diffusion of water in a biological model system, Proc. Natl. Acad. Sci. USA, 91(4):1229-33 (1994).
Laun et al., How background noise shifts eigenvectors and increases eigenvalues in DTI, MAGMA, 22(3):151-8 (2009).
Lazebnik et al., Volume registration using needle paths and point landmarks for evaluation of interventional MRI treatments, IEEE Trans. Med. Imaging, 22(5):653-60 (2003).
Lee et al., A feasibility study evaluating the functional diffusion map as a predictive imaging biomarker for detection of treatment response in a patient with metastic prostate cancer to the bone, Neoplasia, 9(12):1003-11 (2007).
Lee et al., Dynamic imaging of emerging resistance during cancer therapy, Cancer Res., 66(9):4687-92 (2006).
Lee et al., Prospective early response imaging biomarker for neoadjuvant breast cancer chemotherapy, Clin. Cancer Res., 13(2 Pt. 1):443-50 (2007).
Leung et al., Automatic quantification of changes in bone in serial MR images of joints, IEEE Transactions on Medical Imaging, 25(12):1617-26 (2006).

(56) References Cited

OTHER PUBLICATIONS

Li et al., Pulmonary CT image registration and warping for tracking tissue deformation during the respiratory cycle through 3D consistent image registration, Med. Phys., 35(12):5575-83 (2008).

Lorusso et al., Phase I and pharmacodynamic study of the oral MEK inhibitor CI-1040 in patients with advanced malignancies, J. Clin. Oncol., 23(23):5281-93 (2005).

Low et al., Novel breathing motion model for radiotherapy, Int. J. Radiat. Oncol. Biol. Phys., 63(3):921-9 (2005).

Lyng et al., Measurement of cell density and necrotic fraction in human melanoma xenografts by diffusion weighted magnetic resonance imaging, Magn. Reson. Med., 43(6):828-36 (2000).

Ma et al., Asymmetric dipolar cycloaddition reactions: a practical, convergent synthesis of chiral pyrrolidines, Tetrahedron: Asymmetry, 8(6):883-8 (1997).

Ma et al., Voxel-by-voxel functional diffusion mapping for early evaluation of breast cancer treatment, Inf. Process. Med. Imaging, 21:276-87 (2009).

Macdonald et al., Response criteria for phase II studies of supratentorial malignant glioma, J. Clin. Oncol., 8(7):1277-80 (1990).

Magnetic Resonance Imaging, two pages, Churchill Livingstone's Dictionary of Nursing (2006).

Matsuoka et al., Quantitative assessment of air trapping in chronic obstructive pulmonary disease using inspiratory and expiratory volumetric MDCT, AJR Am. J. Roentgenol., 190(3):762-9 (2008).

Matsuoka et al., Quantitative assessment of peripheral airway obstruction on paired expiratory/inspiratory thin-section computed tomography in chronic obstructive pulmonary disease with emphysema, J. Comput. Assist. Tomogr., 31(3):384-9 (2007).

Mattiello et al., The b matrix in diffusion tensor echo-planar imaging, Magn. Reson. Med., 37(2):292-300 (1997).

McCubrey et al., Emerging Raf inhibitors, Expert Opin. Emerg. Drugs, 14(4):633-48 (2009).

Mehta et al., Monitoring radiographic brain tumor progression, Toxins (Basel), 3(3):191-200 (2011).

Meyer et al., A methodology for registration of a histological slide and in vivo MRI volume based on optimizing mutual information, Mol. Imaging, 5(1):16-23 (2006).

Meyer et al., Demonstration of accuracy and clinical versatility of mutual information for automatic multimodality image fusion using affine and thin-plate spline warped geometric deformations, Med. Image Anal., 1(3):195-206 (1997).

Mirzoeva et al., Basal subtype and MPAK/ERK kinase (MET)-phosphoinositide 3-kinase feedback signaling determine susceptibility of breast cancer cells to MEK inhibition, Cancer Res., 69(2):565-72 (2009).

Moffat et al., Diffusion imaging for evaluation of tumor therapies in preclinical animal models, MAGMA, 17(3-6):249-59 (2004).

Moffat et al., Diffusion MR imaging in adult neoplasia, Cup, Cambridge: Physiological MR in Clinical Neuroscience, (2004).

Moffat et al., Functional diffusion map: a noninvasive MRI biomarker for early stratification of clinical brain tumor response, Proc. Natl. Acad. Sci. USA, 102(15):5524-9 (2005).

Moffat et al., The functional diffusion map: an imaging biomarker for the early prediction of cancer treatment outcome, Neoplasia, 8(4):259-67 (2006).

Montagut et al., Targeting the RAF-MEK-ERK pathway in cancer therapy, Cancer Lett., 283(2):125-34 (2009).

Muhlradt et al., Epothilone B stabilizes microtubuli of macrophages like taxol without showing taxol-like endotoxin activity, Cancer Res., 57(16):3344-6 (1997).

Murphy, et al., "Obstructive pulmonary funtion: Pateitn classification using 3D registration of inspiration and expiration CT images," In the Second International Workshop on Pulmonary Image Analysis, pp. 37-47 (2009).

Nakano et al., Computed tomographic measurements of airway dimensions and emphysema in smokers. Correlation with lung function, Am. J. Respir. Crit. Care Med., 162(3 Pt. 1):1102-8 (2000).

Nicolaou et al., Synthesis of epothilones A and B in solid and solution phase, Nature, 387(6630):268-72 (1997).

O'Connor et al., DCE-MRI biomarkers in the clinical evaluation of antiangiogenic and vascular disrupting agents, Br. J. Cancer, 96:189-95 (2007).

Ostergaard et al., High resolution measurement of cerebral blood flow using intravascular tracer bolus passages, Part I: Mathematical approach and statistical analysis, Magn. Reson. Med., 36:715-25 (1996).

Ozcan et al., Characterization of imaging gradients in diffusion tensor imaging, J. Magn. Reson., 207(1):24-33 (2010).

Padhani et al., Diffusion-weighted magnetic resonance imaging as a cancer biomarker: consensus and recommendations, Neoplasia, 11(2):102-25 (2009).

Panda et al., Differential effects of vinblastine on polymerization and dynamics at opposite microtubule ends, J. Biol. Chem., 271(47):29807-12 (1996).

Panda et al., Stabilization of microtubule dynamics by estramustine by binding to a novel site in tubulin: a possible mechanistic basis for its antitumor action, Proc. Natl. Acad. Sci. USA, 94(20):10560-4 (1997).

Park et al., Registration methodology for histological sections and ex vivo imaging of human prostate, Academic Radiology, 15(8) (Aug. 2008).

Pelizzari et al., Three dimensional correlation of PET, CT and MRI images, J. Nucl. Med., 28(4):682-3 (1987).

Petrylak et al., Docetaxel and estramustine compared with mitoxantrone and prednisone for advanced refractory prostate cancer, N. Engl. J. Med., 351(15):1513-20 (2004).

Poulikakos et al., RAF inhibitors transactivate RAF dimers and ERK signalling in cells with wild-type BRAF, Nature, 464(7287):427-30 (2010).

Preusser et al., Current concepts and management of glioblastoma, Ann. Neurol., 70(1):9-21 (2011).

Regan et al., Genetic epidemiology of COPD (COPDGene) study design, COPD, 7(1):32-43 (2010).

Rehemtulla et al., Molecular imaging of gene expression and efficacy following adenoviral-mediated brain tumor gene therapy, Mol. Imaging, 1(1):43-55 (2002).

Reinhardt et al., Registration-based estimates of local lung tissue expansion compared to xenon CT measures of specific ventilation, Med. Image Anal., 12(6):752-63 (2008).

Reinhardt et al., Registration-derived estimates of local lung expansion as surrogates for regional ventilation, Int. Process. Med. Imaging, 20:763-74 (2007).

Reischauer et al., Bone metastases from prostate cancer: assessing treatment response by using diffusion-weighted imaging and functional diffusion maps—initial observations, Radiology, 257(2):523-31 (2010).

Robson, Non-linear gradients on clinical MRI systems introduce systematic errors in ADC and DTI measurements, ISMRM Proceedings (2002).

Rodrigues et al., The C-neu mammary carcinoma in Oncomice; characterization and monitoring response to treatment with herceptin by magnetic resonance methods, MAGMA, 17(3-6):260-70 (2004).

Romeo et al., Magnet field profiling: analysis and correcting coil design, Magn. Reson. Med., 1(1):44-65 (1984).

Rosen et al., Perfusion imaging with NMR contrast agents, Magn. Reson. Med., 14:249-65 (1990).

Ross et al. Assessment of the functional diffusion map: an imaging biomarker for early stratification of glioma clinical response, 2006 ASCO Annual Meeting Journal of Clinical Oncology, 24(18s): 1518 (2006).

Ross et al., Contributions of cell kill and posttreatment tumor growth rates to the repopulation of intracerebral 9L tumors after chemotherapy: an MRI study, Proc. Natl. Acad. Sci. USA, 95(12):7012-7 (1998).

Ross et al., Evaluation of cancer therapy using diffusion magnetic resonance imaging, Mol. Cancer Ther., 2(6):581-7 (2003).

Ross et al., Magnetic resonance imaging in cancer research, Eur. J. Cancer, 38(16):2147-56 (2002).

Ross et al., The role of magnetic resonance in the evaluation of cancer therapeutics, Clin. Cancer Res., 5:3870s-1s (1999).

(56) References Cited

OTHER PUBLICATIONS

Roth et al., High-b-value diffusion-weighted MR imaging for pretreatment prediction and early monitoring of tumor response to therapy in mice, Radiology, 232(3):685-92 (2004).
Sawllani et al., Glioblastoma: a method for predicting response to antiangiogenic chemotherapy by using MR perfusion imaging-pilot study, Radiology, 255(2):622 (2010).
Sawyers, Imatinib GIST keeps finding new indications: successful treatment of dermatofibrosarcoma protuberans by targeted inhibition of the platelet-derived growth factor receptor, J. Clin. Oncol., 20(17):3568-9 (2002).
Schepkin et al., Proton and sodium MRI assessment of emerging tumor chemotherapeutic resistance, NMR Biomed., 19(8):1035-42 (2006).
Scher et al., Prostate cancer clinical trial end points: "RECIST" ing a step backwards, Clin. Cancer Res., 11(14):5223-32 (2005).
Scher et al., The association between measures of progression and survival in castrate-metastatic prostate cancer, Clin. Cancer Res., 13(5):1488-92 (2007).
Sebolt-Leopold et al., Targeting the mitogen-activated protein kinase cascade to treat cancer, Nat. Rev. Cancer, 4(12):937-47 (2004).
Sebolt-Leopold, Advances in the development of cancer therapeutics directed against the RAS-mitogen-activated protein kinase pathway, Clin. Cancer Res., 14(12):3651-6 (2008).
Shimizu et al., The clinical effect of the dual-targeting strategy involving PI3K/AKT/mTOR and RAS/MEK/ERK pathways in patients with advanced cancer, Clin. Cancer Res., 18(8):2316-25 (2012).
Sos et al., Identifying genotype-dependent efficacy of single and combined PI3K- and MAPK-pathway inhibition in cancer, Proc. Natl. Acad. Sci. USA, 106(43):18351-6 (2009).
Stegman et al., Diffusion MRI detects early events in the response of a glioma model to the yeast cytosine deaminase gene therapy strategy, Gene Ther., 7(12):1005-10 (2000).
Taichman et al., The evolving biology and treatment of prostate cancer, J. Clin. Invest., 117)9):2351-61 (2007).
Tannock et al., Docetaxel plus prednisone or mitoxantrone plus prednisone for advanced prostate cancer, N. Engl. J. Med., 351(15):1502-12 (2004).
Therasse et al., New guidelines to evaluate the response to treatment in solid tumors. European Organization for Research and Treatment of Cancer, National Cancer Institute of the United States, National Cancer Institute of Canada, J. Natl. Cancer Inst., 92(3):205-16 (2000).
Thomas et al., Phase I study of the safety, tolerability, pharmacokinetics and pharmacodynamics of PTK787/ZK 222584 administered twice daily in patients with advanced cancer, J. Clin. Oncol., 23:4162-71 (2005).
Tofts et al., Estimating kinetic parameters from dynamic contrast-enhanced T(1)-weighted MRI of a diffusable tracer: standardized quantities and symbols, J. Magn. Reson. Imaging, 10:223-32 (1999).
Tofts, Modeling tracer kinetics in dynamic Gd-DTPA MR imaging, J. Magn. Reson. Imaging, 7:91-101 (1997).
Tsien et al., Parametric response map as an imaging biomarker to distinguish progression from pseudoprogression in high-grade glioma, J. Clin. Oncol., 28(13):2293-9 (2010).
Vasquez et al., Nanomolar concentrations of nocodazole alter microtubule dynamic instability in vivo and in vitro, Mol. Biol. Cell, 8(6):973-85 (1997).
Venegas, et al., "Self-organized patchiness in asthma as a prelude to catastorphic shifts," Nature 434:777-782 (2005).
Vilanova et al., Diffusion-weighted whole-body MR screening, Eur. J. Radiology, 67(3):440-7 (2008).
Viola et al., Alignment by maximization of mutual information, in Proceedings of 5th Intl. Conf. on Computer Vision, MIT, IEEE Press 95CH35744:16-23 (1995).
Washko et al., Identification of early interstitial lung disease in smokers from the COPDGene Study, Acad. Radiol., 17(1):48-53 (2010).
Washko et al., Lung volumes and emphysema in smokers with interstitial lung abnormalities, N. Engl. J. Med., 364(10:897-906 (2011).
Watts et al., "Relationship Between Changes in BMD and Nonvertebral Fracture Incidence Associated with Risedronate: Reduction in risk of Nonvertebral Fracture is not Related to Change in BMD," J Bone Miner Res. 20:2097-104 (2005).
Wee et al., PI3K pathway activation mediates resistance to MEK inhibitors in KRAF mutant cancers, Cancer Res., 69(10):4286-93 (2009).
Wen et al., Updated response assessment criteria for high-grade gliomas: response assessment in neuro-oncology working group, J. Clin. Oncol., 28(11):1963-72 (2010).
Wilson et al., Radiofrequency thermal ablation: 3D MR histology correlation for localization of cell death in MR lesion images, in: Proceedings of Intl. Symp. Biomed. Imaging, pp. 1537-1540 (2004).
World Health Organization, WHO Handbook for Reporting Results of Cancer Treatment, World Health Organization Offset Publication, Atlanta (1979).
Wu et al., A method for calibrating diffusion gradients in diffusion tensor imaging, J. Comput. Assist. Tomogr., 31(6):984-93 (2007).
Xiong et al., A phase I surrogate endpoint study of SU68868 in patients with solid tumors, Invest. New Drugs, 22:459-66 (2004).
Yamashiro et al., Collapsibility of lung volume by paired inspiratory and expiratory CT scans: correlations with lung function and mean lung density, Acad. Radiol., 17(4):489-95 (2010).
Yim et al., Deformable lung registration between exhale and inhale CT scans using active cells in a combined gradient force approach, Med. Phys., 37(8):4307-17 (2010).
Yin et al., Mass preserving nonrigid registration of CT lung images using cubic B-spline, Med. Phys., 36(9):4213-22 (2009).
Yu et al., Response and determinants of cancer cell susceptibility to PI3K inhibitors: combined targeting of PI3K and Mek1 as an effective anticancer strategy, Cancer Biol. Ther., 7(2):307-15 (2008).
Zacharaki et al., ORBIT: A multiresolution framework for deformable registration of brain tumor images, IEEE Trans. Med. Imaging, 27(8):1003-17 (2008).
Zahra et al., Dynamic contrast-enhanced MRI as a predictor of tumour response to radiotherapy, Lancet Oncol., 8:63-74 (2007).
Zarow et al., A standardized method for brain-cutting suitable for both stereology and MRI-brain co-registration, J. Neurosci. Methods, 139(2):209-15 (2004).
Zhao et al., Early detection of treatment response by diffusion-weighted 1H-NMR spectroscopy in a murine tumour in vivo, Br. J. Cancer, 73(1):61-4 (1996).

\* cited by examiner

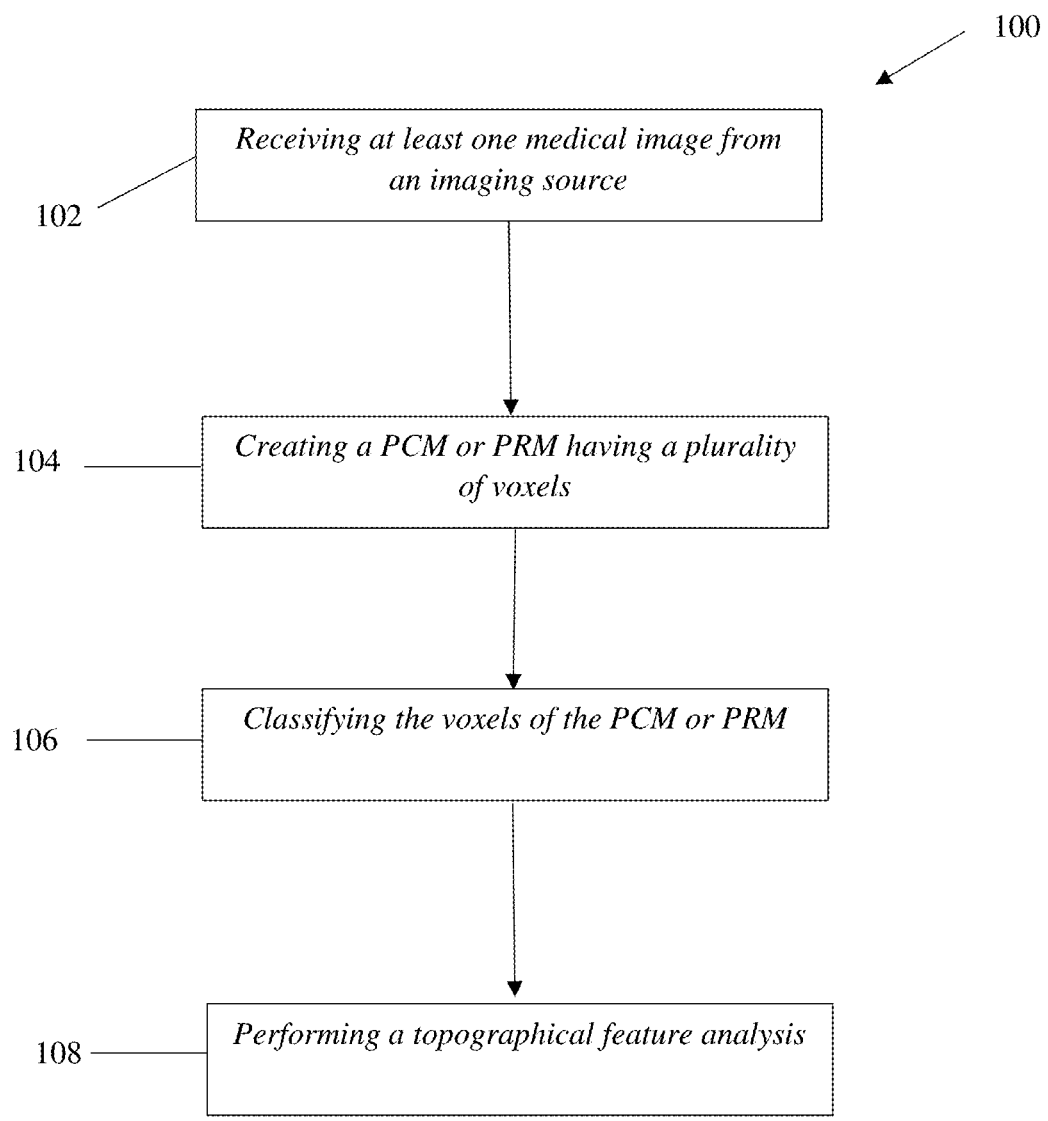

SYSTEMS AND METHODS FOR TOPOGRAPHICAL CHARACTERIZATION OF MEDICAL IMAGE DATA

CROSS REFERENCE TO RELATED APPLICATIONS

This application claims priority to U.S. Provisional Application No. 62/349,985, entitled Systems and Methods for Spatial Characterization of Image Data, and filed Jun. 14, 2016, which is incorporated herein by reference in its entirety. Further, this application relates to U.S. application Ser. No. 13/539,254, entitled Tissue Phasic Classification Mapping System and Method, and filed Jun. 29, 2012; U.S. application Ser. No. 12/395,194, issued as U.S. Pat. No. 9,289,140, entitled Systems and Methods for Imaging Changes in Tissue, and filed Feb. 27, 2009; U.S. application Ser. No. 13/462,500, issued as U.S. Pat. No. 8,768,431, entitled Systems and Methods for Tissue Imaging, and filed May 2, 2012; U.S. application Ser. No. 13/683,746, issued as U.S. Pat. No. 9,053,534, entitled Voxel-Based Approach for Disease Detection and Evolution, and filed Nov. 21, 2012, each of which is incorporated herein by reference in its entirety.

STATEMENT OF GOVERNMENT SUPPORT

This invention was made with government support under grant CA085878 awarded by the National Institutes of Health. The government has certain rights in the invention.

FIELD OF THE INVENTION

The present disclosure relates to novel and advantageous systems and methods for monitoring tissue regions and, more particularly, to systems and methods for characterizing tissue regions to determine disease severity.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Chronic obstructive pulmonary disease (COPD) is a highly and increasingly prevalent disorder referring to a group of lung diseases that block airflow during exhalation and make it increasingly difficult to breathe. COPD is one cause of morbidity, mortality, and healthcare cost worldwide with an estimated global prevalence of approximately 12% of adults aged ≥30 years in 2010 and rising with the ageing population. COPD can cause coughing that produces large amounts of mucus, wheezing, shortness of breath, chest tightness, and other symptoms. Emphysema and chronic asthmatic bronchitis are two of the main conditions that make up COPD. Cigarette smoking is one leading cause of COPD. Many people who have COPD smoke or used to smoke. Long-term exposure to other lung irritants, such as air pollution, chemical fumes, or dust, also may contribute to COPD. In all cases, damage to lung airways may eventually interfere with the exchange of oxygen and carbon dioxide in the lungs, which can lead to bodily injury. COPD is generally identified by airway limitations that may arise from progressive emphysematous lung destruction, small airways disease, or a combination of both. COPD is a heterogeneous disorder that can arise from pathological processes including emphysematous lung tissue destruction, gross airway disease, and functional small airways disease (fSAD) in varying combinations and severity within an individual patient. It is generally accepted that fSAD and emphysema are two main components of COPD and that a spectrum of COPD phenotypes with varying contributions of these two components exists in individual patients. Recent reports found that COPD etiology varies among populations, including risk factors associated with tobacco smoke, cooking fuels, environmental pollution and family genetics. This has led to the current understanding that COPD covers a spectrum of pathophysiologies.

Given the high prevalence and clinical cost of COPD, there is a need for further advancements to enable COPD phenotypes and therapy response to be quantified. Beyond COPD, small airway obstruction is a primary manifestation in various other lung diseases, including asthma, obliterative bronchiolitis, and cystic fibrosis. Venegas, J. G., et al. Self-organized patchiness in asthma can represent a prelude to catastrophic shifts. *Nature* 434, 777-782 (2005). Some have recently explored the importance of disease heterogeneity and local interaction between neighboring structures using model simulations of asthma. They have shown that small heterogeneity in ventilation potential produces an imbalance in the system leading to large patched effects, termed self-organized clustering.

Numerous techniques have been used in attempting to measure COPD, including several imaging techniques. Computer tomography (CT) is a minimally invasive imaging technique that is capable of providing both high contrast and detailed resolution of the pulmonary systems and that has been used to aid physicians in identifying structural abnormalities associated with COPD. Although CT is primarily used qualitatively (i.e., through visual inspection), research has been devoted to the application of quantitative CT, measured in Hounsfield Units (HU) for identifying underlying specific COPD phenotypes, with the hopes that such quantitative techniques would dictate an effective treatment strategy for the patient. Knowing the precise COPD phenotype for an individual patient, including the location, type, and severity of damage throughout the lungs would allow for the formulation of a tailored treatment regimen that accounts for the patient's specific disease state.

Clinical presentation and monitoring of COPD have been described primarily through spirometry as pulmonary function measurements, such as forced expiratory volume in one second (FEV1). Although highly reproducible, these measurements assess the lungs as a whole and are unable to differentiate two important components of COPD: emphysema and small airways disease. In addition, spirometry does not provide spatial context for regional heterogeneity of these components. X-ray computed tomography (CT) has addressed some of these limitations by allowing clinicians to verify emphysema in patients exhibiting loss of pulmonary function. Even with these techniques, COPD is often undiagnosed in early stages, impeding proper treatment with the disease potentially progressing to permanent lung damage (i.e. emphysema). Although COPD phenotyping has been prolifically reported in the literature, lack of accurate diagnostic tools have hampered the development of effective therapies. Nevertheless, significant advances in technologies are providing physicians opportunities to shift towards more effective, localized therapies.

Various strategies have been undertaken to identify metrics that more accurately assess COPD subtypes, such as genetic, molecular and cellular markers as well as medical imaging devices and methodologies. Although advances in biological phenotyping have shown promise in identifying disease heterogeneity in patients, these approaches are generally either global measures or highly invasive. In contrast, medical imaging provides clinicians with a relatively non-invasive and reproducible approach that provides functional information that is spatially defined.

A variety of CT-based metrics have been evaluated separately on inspiratory and expiratory CT scans or in combination. One metric that may be used is the lung relative volume of emphysema known as Low Attenuation Areas (LAA), which is determined by the sum of all image voxels with HU<−950 normalized to total inspiratory lung volume on a quantitative CT scan. This metric may be calculated using standard imaging protocols making it readily measurable at clinical sites for evaluation, and the LAA approach has been validated by pathology. However, this metric only identifies a portion of one component (i.e. emphysema) of the spectrum of underlying COPD phenotypes discussed above. Nevertheless, the validation of LAA has prompted researchers to investigate the utility of inspiratory and expiratory CT scans, either analyzed individually as with LAA or in unison, to identify imaging biomarkers that provide for a more accurate correlate of COPD.

Although various instruments (e.g. PET, SPECT and MRI) are heavily investigated as surrogates of clinical outcome, CT, with its high resolution and lung contrast, continues to be the most widely used medical imaging device in the clinic. As such, advances in this technology are likely to have an important impact on patient care. CT can be considered a quantitative map, where attenuation scans are approximated as linearly proportional to tissue density, represented as Hounsfield units (HU). Extensive research in CT image post-processing has generated an array of potentially diagnostic and prognostic measures. Filter-based techniques and airway wall measurements have been also been used. Although these methodologies have advanced understanding of COPD, many have found limited use in the clinic due to concerns about cost and radiation exposure. Nevertheless, the quantification of discrete phenotypes of emphysema using CT has had an impact on patient care. At present at least three emphysema patterns (i.e., centrilobular, panlobular, and paraseptal emphysema) have been identified, each of which are strongly associated with a range of respiratory physiologies and functional measures. The understanding that spatial patterns of emphysema serve as indicators of COPD subtypes has spawned progress in lobe segmentation algorithms as well as the need to evaluate topological features.

BRIEF SUMMARY OF THE INVENTION

The present disclosure, in one or more embodiments, relates to a computer-implemented method of analyzing a medical image to assess the state of a sample area or region of tissue. The method may comprise receiving a medical image containing the sample area or region of tissue, wherein the medical image was obtained from a medical imaging device, where the medical image comprises a plurality of voxels, each characterized by a signal value; and then calculating at least one topographical feature of the medical image. The medical image may be selected from the group consisting of a phasic classification map, a parametric response map, a diffusion image, a perfusion image, a permeability image, a normalized image, a spectroscopic image, a kinetic parameter map and a quantified image. The medical imaging device may be selected from the group consisting of magnetic resonance imaging (MRI), computed tomography (CT), two-dimensional planar X-ray (either plain film converted to digital images, or digital X-ray images), X-ray mammography, positron emission tomography (PET), ultrasound (US), or single-photon emission computed tomography (SPECT). In some embodiments, the topographical features may be selected from the group consisting of surface area, mean curvature length, the Euler-Poincare characteristic and a condensed descriptor of aggregation.

Additionally, the present disclosure, in one or more embodiments, relates to a computer-implemented method of analyzing a sample region of tissue, for example a lung, with dynamic bodily movement (e.g. inhalation and exhalation) to determine the condition of the sample region. The method may, in at least one embodiment, comprise receiving, using a medical imaging device, a first image data set of the sample region at a first position or during a first bodily movement, the first image data set comprising a first plurality of voxels each characterized by a signal value; and receiving, using the medical imaging device, a second image data set of the sample region at a second position or during a second bodily movement, the second image data set comprising a second plurality of voxels each characterized by a signal value in the second image data set. The method may further comprise deformably registering the first image data set and the second image data set to produce a co-registered image data set that comprises a plurality of co-registered voxels, wherein each of the co-registered voxels includes the signal value of the voxel associated with the first image data set, and the signal value of the voxel from the second image data set. A threshold analysis may then be performed on the co-registered voxels to identify co-registered voxels indicating the presence or absence of damaged tissue. For example, with lung tissue, co-registered voxels with a first signal value of greater than a threshold value may indicate the absence of emphysematous tissue, and a second signal value of less than a threshold value may indicate the presence of air-trapping, non-emphysematous tissue. The method may further comprise performing a topographical feature analysis of the emphysematous tissue and/or performing a topographical feature analysis of the air-trapping, non-emphysematous tissue. In some embodiments, the topographical feature analysis quantifies features selected from the group comprising of surface area, mean curvature length, the Euler-Poincare characteristic and a condensed descriptor of aggregation.

Further, the present disclosure, in one or more embodiments, relates to a computer-implemented method for analyzing a parametric response map or a phasic classification map. The method may comprise receiving a first set of parametric measurement data for a tissue region, the first set of parametric measurement data comprising a plurality of voxels; and receiving one or more subsequent sets of parametric measurement data, each subsequent set of parametric measurement data comprising a plurality of voxels. The method may further comprise registering the one or more subsequent sets of parametric measurement data with the first set of parametric response data. At least one classification of at least one of the plurality of voxels may then be performed within the tissue region, on a voxel-by-voxel basis, based on the change in parametric measurement data, using a defined threshold for change, wherein each of the changes is determined by comparing voxels of the one or more subsequent sets of parametric measurement data to the voxels on one or more subsequent sets of parametric measurement data obtained previously or to the voxel of the first set of parametric measurement data. The method may still further provide performing a topographical feature analysis of the voxels with increased parametric measurement properties and/or a topographical feature analysis of at least one of the classifications. In some embodiments, the topographical feature analysis may quantify at least one of the topographical features, including surface area, mean curvature length, the Euler-Poincare characteristic, and/or a condensed descriptor of aggregation. In some embodiments, the parametric measurement data may be selected from the group consisting of a phasic classification map, a parametric response map, a diffusion image, a perfusion image, a permeability image, a normalized image, a spectroscopic image, a kinetic parameter map and/or a quantified image.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1 is a flow chart of a method of analyzing one or more images, in accordance with at least one embodiment of the present disclosure.

DETAILED DESCRIPTION

Figure 2A:
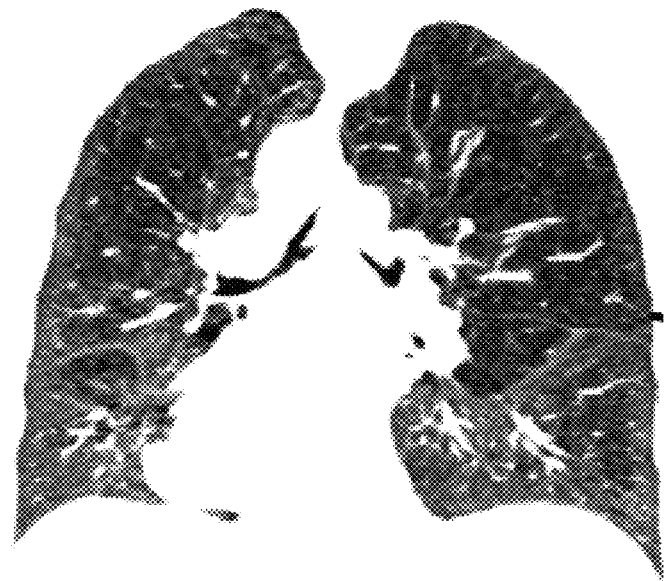
FIGS. 2A-2B are examples of images retrieved from an imaging source, according to the exemplary method of FIG. 1.

The present disclosure relates to computer-implemented systems and methods for assessing a variety of tissue states using a phasic classification map (PCM) analysis or a parametric response map (PRM) analysis of quantitative medical image data. Although the disclosure herein is discussed with respect to medical images or medical image data retrieved from one or more PCMs or PRMs, the medical images may be a diffusion image, a perfusion image, a permeability image, a normalized image, a spectroscopic image, a quantified image, and other suitable medical images. Likewise, the medical image data may be retrieved from a diffusion image, a perfusion image, a permeability image, a normalized image, a spectroscopic image, a quantified image, and other suitable medical images.

In some embodiments, the systems and methods of the present disclosure may use deformation registration of medical image data, comparing medical images taken at different tissue states, in some cases temporally, from which a voxel-by-voxel, or pixel-by-pixel, image analysis may be performed. The analysis may be based on a computer-implemented algorithm that compares the patient's medical image(s) to one of more medical image(s) of the same or similar tissue regions from the same patient, which may have been obtained earlier, or from one or more other individuals for whom the corresponding health status and/or outcomes are known.

The medical image(s) or medical image data for the patient's image(s) may be from a variety of different imaging sources, including, but not limited to magnetic resonance imaging (MRI), computed tomography (CT), two-dimensional planar X-ray (either plain film converted to digital images, or digital X-ray images), X-ray mammography, positron emission tomography (PET), ultrasound (US), or single-photon emission computed tomography (SPECT). Within a given imaging source (i.e. MRI, CT, X-Ray, PET, and SPECT), a variety of data may be generated. For example, MRI devices may generate diffusion, perfusion, permeability, normalized and spectroscopic images, which includes molecules containing, for example, but not limited to 1H, 13C, 23Na, 31P, and 19F, hyperpolarized Helium, Xenon and/or 13C MRI, which may also be used to generate kinetic parameter maps. PET, SPECT, and CT devices are also capable of generating static images as well as kinetic parameters by fitting temporally resolved imaging data to a pharmacokinetic model. Imaging data, irrespective of source and modality, may presented as quantified (i.e., made to have physical units) or normalized (i.e., images scaled so that the pixel intensities fall within a known range based on an external phantom, something of known and constant property, or a defined signal within the image volume) maps so that images may be compared between patients as well as data acquired during different scanning sessions.

Imaging data or sets of images or imaging data may be acquired for a tissue region at different times and/or at different phase states of movement. For example, in some embodiments, a first set of image data may be acquired prior to a treatment, and a second set of image data may be acquired after administration of the treatment. As another example, in some embodiments, a first set of image data may be acquired during a first phase state of movement, such as lung inspiration, and a second set of image data may be acquired during a second phase state of movement, such as lung expiration. As yet another example, a first set of image data may be acquired during a first phase state of movement, such as flexion of a muscle, and a second set of image data may be acquired during a second phase state of movement, such as extension of a muscle.

The systems and methods of the present disclosure are not limited to a particular type or kind of tissue region or a particular type of motion or movement. By way of example only, suitable tissue types include lung, prostate, breast, colon, rectum, bladder, ovaries, skin, liver, spine, bone, pancreas, cervix, lymph, thyroid, spleen, adrenal gland, salivary gland, sebaceous gland, testis, thymus gland, penis, uterus, trachea, skeletal muscle, smooth muscle, heart, brain, and other tissue types. In some embodiments, the tissue region may be a whole body or large portion thereof (for example, a body segment such as a torso or limb; a body system such as the gastrointestinal system, endocrine system, etc.; or a whole organ comprising multiple tumors, such as whole liver) of a living human being. In some embodiments, the tissue region may be a diseased tissue region. In some embodiments, the tissue region may be an organ. In some embodiments, the tissue region may be a tumor, for example, a malignant or benign tumor. In some embodiments, the tissue region is a breast tumor, a liver tumor, a bone lesion, and/or a head/neck tumor. In some embodiments, the tissue may be from a non-human animal. By way of example only, suitable movements may include respiratory and cardiac cycle movements, smooth and striated muscle contraction, joint and spinal positioning for assessment by Dynamic-Kinetic MRI and positional MRI, and induced propagated waves at varying frequencies in tissues or tumors assessed by magnetic resonance elastography.

In addition, the systems and methods of the present disclosure are not limited to a particular type or kind of treatment. In some embodiments, the systems and methods of the present disclosure may be used as part of a pharmaceutical treatment, a vaccine treatment, a chemotherapy based treatment, a radiation based treatment, a surgical treatment, a homeopathic treatment, or a combination of treatments. In other embodiments, the systems and methods of the present disclosure may be used for screening for disease, prognosis or diagnosis of diseases, base-line assessments, treatment planning, treatment follow-up, or other education regarding tissue state.

In previously known methods of analysis, images are generally interpreted subjectively based on image contrast, or quantitatively by lesion size, for example. In contrast, embodiments of the systems and methods of the present disclosure may objectively depict the image contrast change over time in normal and diseased tissue for use as a potential surrogate indicator of disease evolution, for example, response or progression.

In some embodiments, the method of the present disclosure may include obtaining at least two volumetric medical images via an imaging modality; registering the image(s) to a reference image set; segmenting the voxel-by-voxel differences relative to a specified significance threshold; quantifying the volume of voxels that exceed an established threshold or amount of change; and/or producing at least one classified or colorized parametric response map (PRM) of one or more tissue regions that exhibit significant change. Embodiments of the present disclosure may include more, fewer, or different steps. In some embodiments, standard non-quantitative images, such as standard MRI using conventional whole tissue/volume statistical approaches (for example, but not limited to mean, median, skewness, percentile, kurtosis, Kullback-Leibler, quantiles, standard deviation, etc.), may be used to create a PRM, after the images have been normalized in accordance with embodiments of the present disclosures.

In some embodiments, the systems and methods of the present disclosure relate to automatically retrieving an objective description of the spatial characteristics of PRM categories indicating, for example, increased, decreased or stable areas of cerebral blood volume ("CBV"). Examples of spatial characteristics of PRM categories include, but are not limited to, statistically significant increased parametric values, statistically significant decreased parametric values, statistically static parametric values, parametric values above one threshold in one image and below another threshold in another image, parametric values above one threshold in one image and above another threshold in another image, or parametric values below one threshold in one image and below another threshold in another image. Examples of other conditions or features indicated by the spatial characteristics of PRM categories include, but are not limited to, an apparent diffusion coefficient (ADC), capillary permeability (Ktrans), and standard uptake value (SUV), among others. In other embodiments, spatial characteristics of PRM categories resulting from other parametric imaging data can be analyzed that include but are not limited to, apparent diffusion coefficients (ADC), pharmacokinetic parameters (e.g. $K_{trans}$) or standard uptake value (SUV). Advantageously, embodiments of the present disclosure may use conventional non-quantitative (i.e. conventional "weighted") images that are normalized and subsequently analyzed. Prior to analysis, in some embodiments, linear or deformable algorithms may be applied to the images to spatially align them. In other words, the images that are obtained at different scan intervals are aligned with the reference image. Objective analysis of the topographical properties of PRM categories can provide for detailed insight into the status, extent, progression and response of a disease using images obtained from any of the imaging sources and imaging modalities discussed above.

At least some embodiments of the present disclosure may use a voxel-based PRM approach to provide for the early detection and spatial depiction of, for example, tumor progression prior to detection by currently available conventional MRI-based criteria, as described, for example, in U.S. application Ser. No. 13/683,746, issued as U.S. Pat. No. 9,053,534, entitled Voxel-Based Approach for Disease Detection and Evolution, and filed Nov. 21, 2012, which is incorporated by reference herein in its entirety. Other extensions of the systems and methods of the present disclosure include applications using many other weighted image data types, such as, but not limited to T1, T2, proton density images, FLAIR and STIR (inversion recovery pulses), metabolite-specific images, pulsed gradient spin echo images (PGSE), and/or oscillating gradient spin echo (OGSE) for MRI that when normalized are used to monitor changes associated from a multitude of disease types and across all tissue types over time. Normalized data generated from other medical imaging devices (e.g. optical, CT, X-Ray, PET, and SPEC) are also applicable.

Additionally, in some embodiments, the present disclosure relates to spatial characteristics of imaging data. The spatial characteristics may be the same as the PRM categories discussed above, but the data being analyzed are, in some embodiments, very different. With respect to the spatial characteristics of PRM categories, the spatial characteristics of some change in the images may be reviewed, according to some embodiments. These may be with respect to multiple images. In the case of the spatial characteristics of imaging data, the spatial characteristics of only one single image are being reviewed, according to some embodiments. For example, in some embodiments, the present disclosure relates to classifying COPD phenotypes by their topological properties. Utilizing component classification maps derived from PRM or PCM, disease patterns may be extracted and quantified to generate imaging surrogates of relevant clinical outcome measures. Although other methods have evaluated PRM and PCM as a quantitative index of disease type and extent, spatial context of PRM and PCM has been under-utilized. For example, topological evaluation of COPD components, as derived by PCM, may lead to better-informed clinical care and provide further insight into the heterogeneous clinical subtypes of COPD. Parameters that represent different topological features of PRM and PCM classification maps may include: surface area (S), mean curvature length (B), the Euler-Poincare characteristic ($\chi$), and a condensed descriptor of aggregation ($\alpha$). Additional parameters that represent different topological features may include volume, mean breadth, perimeter, and genus.

In some embodiments, the methods of the present disclosure may use a voxel-by-voxel, or pixel-by-pixel, PCM analysis for assessing tissue states, such as COPD severity in lung tissue, or other tissue states of the lung or other tissue that may be associated with other conditions or diseases. PCM may generally be considered a particular application of another voxel-based method, the parametric response map (PRM). PRM was developed and shown to improve the sensitivity of diffusion-MRI data to aid in identifying early therapeutic response in glioma patients. PRM, when applied to diffusion-MRI data, had been validated as an early surrogate imaging biomarker for gliomas, head and neck cancer, breast cancer and metastatic prostate cancer to the bone, for example. In addition, PRM has been applied to temporal perfusion-MRI for assessing early therapeutic response and survival in brain cancer patients. PRM is found to improve the sensitivity of the diffusion and perfusion MRI data by classifying voxels based on the extent of change in the quantitative values over time. This approach provides not only spatial information and regional response in the disease state to treatment but is also a global measure that can be used as a decision making tool for the treatment management of patients. The global measure is presented as the relative volume of tumor whose quantitative values have increased, decreased or remained unchanged with time. As used herein, PCM may be considered a particular application of PRM as applied to cyclic image data. Throughout this application, the methods or systems of the present disclosure may be referred to as either PRM or PCM.

The systems and methods of the present disclosure may be sensitive enough to detect varying tissue states, from a normal state through to a diagnosable pathology condition, for example. There are generally at least three steps in applying PRM or PCM prior to clinical diagnosis, including: image acquisition from an imaging source such as CT, co-registration and other image processing, and classification of the voxels making up the processed image by comparing a signal value of the voxel to one or more threshold values. Various classification schemes are contemplated and within the spirit and scope of the present disclosure. In some embodiments, the classification scheme can include color-coded voxels of the processed images that form the PCM. For example, in some cases, the classification system may include color coded voxels representing healthy lung parenchyma, that is normal lung tissue, the color green; color coding voxels representing tissue exhibiting functional small airways disease (fSAD), the color yellow; and color coding voxels representing emphysema, the color red. It will be understood that the color coding scheme could be any suitable color coding scheme and may employ any suitable or desirable colors. In other embodiments, a classification scheme may comprise, for example, instead of using colors, varying shades of gray may be used to denote the different classifications. Further, in some embodiments, a classification scheme may comprise different geometric shapes could be used, for example open circles and closed circles, or any other suitable method for denoting differences between individual voxels on a parametric response map may be used.

In contrast to conventional CT-based quantitative measures, the systems and methods of the present disclosure may use deformable registration to align images of different phases of the respiratory cycle, specifically at inspiration and expiration. Deformable registration locally warps one image so that its features and structures align with at least one other image or previous images that have been subject to deformable registration. Deformable registration occurs in such a way that volume is not necessarily preserved. The systems and methods of the present disclosure may identify unique signatures of disease extent where local variations in lung function are classified based on a voxel-by-voxel comparison of a signal value indicating lung density, as measured in Hounsfield Units (HU), from co-registered scans acquired during inspiratory and expiratory cycles to provide a global measure as well as a local measure of COPD severity. These local variations may be determined by taking two or more images acquired at different phases of movement, and/or at different times, and performing deformable registration on the images, from which clinically meaningful data may be extracted and used in diagnostic and prognostic treatments. In some examples, numerous thresholds may be applied to the different phase images, offering a 2, 3, 4 color (or more) set of images and corresponding metrics. The result is a technique by which PCM may be used as a prognostic imaging biomarker of disease, using conventional imaging protocols (CT, MRI, etc.) acquired at varying physiological states of the lung. While the difference in signal values of co-registered voxels is described herein as important and providing information that may be used in the PCM techniques described herein, it is also contemplated that in some embodiments it is not only the difference between signal values of voxels from serial images that may convey information, but the initial value or baseline value that may also convey meaningful information and may be incorporated into embodiments of the present disclosure.

While some examples provided herein disclose the collection of two images (for example, one image taken at inspiration and one taken at expiration for the purposes of characterizing and assessing lung tissue), it is also contemplated and within the spirit and scope of the present disclosure, that multiple images may be collected and used to generate a PCM or a PRM. For example, in an embodiment of the present disclosure, PCM may be used to classify and assess the state of cardiac tissue. Accordingly, multiple images, for example from two to at least fourteen images, may be taken throughout a cardiac cycle and used to create a PCM to assess cardiac tissue.

Different methods have been proposed for quantifying spatial patterns and heterogeneity, including fractal analysis, variograms, lacunarity analysis, and Minkowski functionals (MF), of which many have been used to study lung diseases. In some embodiments, Minkowski functionals may be particularly useful as open source algorithms are readily available and may be applied to an entire object or computed locally to retain spatial information. As a sensitive measure of diffuse disease vs. aggregated disease, these functions (i.e. S, B, $\chi$ and $\alpha$) may be executed on PRM classification maps, to reveal unique spatial patterns of disease, emphysematous and non-emphysematous air trapping for example, as indicators of meaningful clinical measures. By incorporating phenotypic information obtained by PRM with spatial patterns by topological analyses, information within paired CT data may be evaluated.

Extensive work has been performed for stratification of disease phenotypes through analysis of emphysema patterns. Many of these studies have concluded that diffuse emphysema patterns are indicative of an accelerated decline in lung function. Because identification of the non-emphysematous component has only recently been attainable, little is known about the effect of its spatial distribution on clinical outcomes. Wide variations in PRM-derived fSAD distributions are known to exist from qualitative observations, and fSAD heterogeneity, through S, may be significantly correlated with clinical measures and may provide complementary insight into the disease than what is attainable through disease extent alone.

An important feature of the systems and methods of the present disclosure is the retention of spatial information from the original PRM classification maps, which is generally a time-consuming process. In at least one embodiment, to reduce processing time while maintaining sufficient spatial information, local determination of topologic indices can be performed using a gridded analysis where a first moving window overlaps a second window, each window with sufficient local image information to adequately describe the local metric behavior. The results may be affected by the selection of such parameters as grid spacing and kernel size and shape. The sensitivity of each topological parameter may vary based on the process of local analysis.

The ability of the systems and methods of the present disclosure to retain spatial context of local topology may help focus clinicians on specific disease-driving tissue regions. More specifically, the systems and methods of the present disclosure may also aid in the targeting of high risk lung regions for more-invasive interventions such as airway brushing, lavage, and biopsy, reducing sampling error.

The systems and methods of the present disclosure further include extracting topological features from PRM for spatial characterization of COPD phenotypes. In at least one embodiment shown in FIGS. 1-6, the fSAD pattern may be used as a key characteristic for assessing disease severity.

Figure 2B:
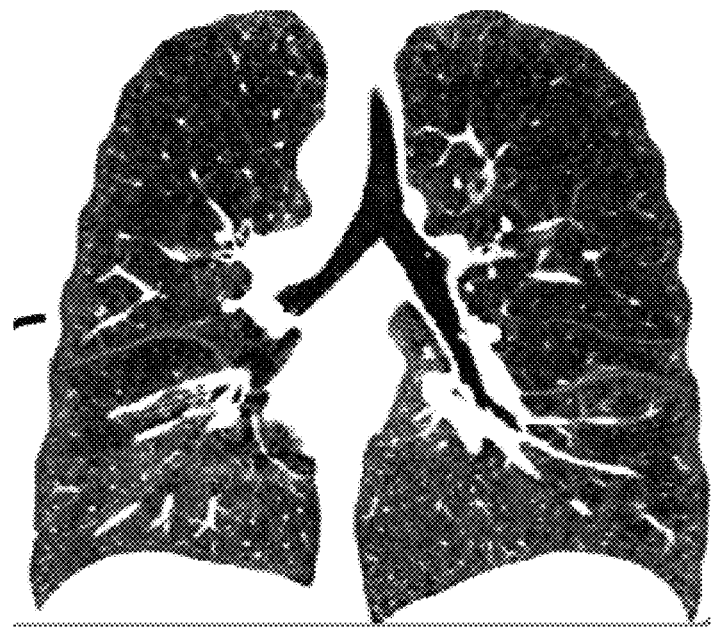

FIG. 1 shows an example of at least one method 100 of the present disclosure, receiving at least one medical image from an imaging source, as shown at 102; creating a PCM or PRM having a plurality of voxels, as shown at 104; classifying the voxels of the PCM or PRM, as shown at 106; and performing a topographical feature analysis as shown at 108. As shown in FIG. 2A, an image of a lung from at least one COPD patient during expiration may be received from an imaging source such as CT, and as shown in FIG. 2B, an image of a lung from at least one COPD patient during inspiration may be received from the imaging source. In at least one embodiment, lung parenchyma and airways can be segmented from the thoracic cavity to restrict image registration and analysis to lung parenchyma. In some embodiments, a filter such as a de-noising filter may be applied to the at least one image to reduce noise or other image distortion. In at least one embodiment, a 2D median filter may be used on each axial slice with a moving window of 32 voxels in order to mitigate the effect of noise on resulting spatial maps. In some embodiments, two or more images may then be spatially aligned using an automated algorithm. For example, the image during inspiration may be aligned with the image during expiration.

Figure 3A:
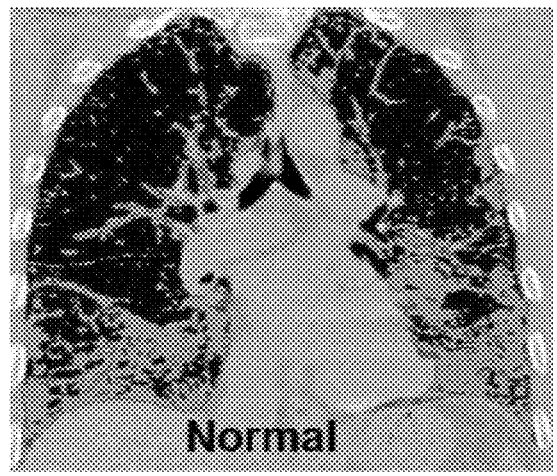
FIGS. 3A-3C are examples of the parametric response maps generated from the images of FIGS. 2A-2B, according to the exemplary method of FIG. 1.
Figure 3B:
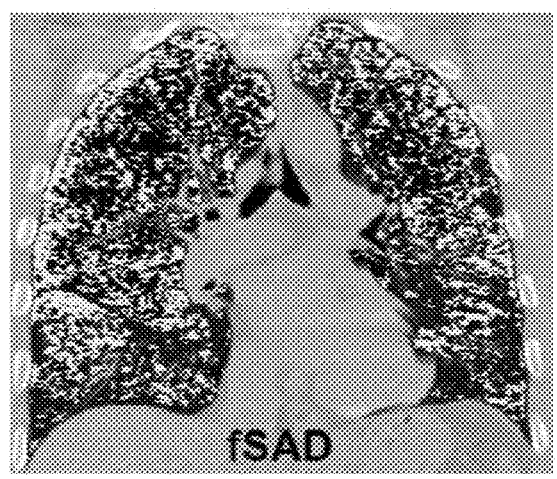
Figure 3C:
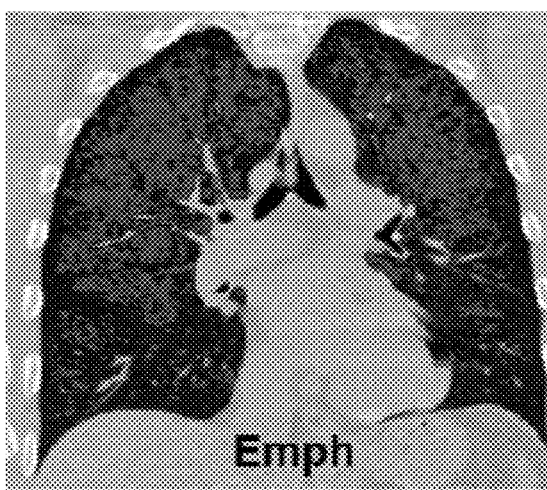

A PCM or a PRM comprising multiple voxels may then be created from the image(s), and an analysis performed on the PCM, PRM, or other parametric measurement data wherein the voxels may be classified according to one or more classifications based on at least one threshold. In at least the embodiment shown in FIGS. 3A-3C, voxels may classified into one of three classifications by imposing two thresholds: (i) −950 HU on inspiratory CT and (ii) −856 HU on expiratory CT. The classifications have been previously reported to identify healthy lung parenchyma ($PRM^{Normal}$, green; >−950 HU on inspiration and >−856 HU on expiration), functional small airways disease ($PRM^{fSAD}$, yellow; >−950 HU on inspiration and ≤−856 HU on expiration), and emphysema ($PRM^{Emph}$, red; ≤−950 HU on inspiration and ≤−856 HU on expiration). Global measures from PRM analysis may be reported as the relative lung volume for each classification. In order to minimize the contribution of blood vessels and airways in the analysis, all voxels with HU values >−500 HU in either scan may be omitted. FIGS. 3A-3C show examples of a PCM or a PRM created from the images of FIGS. 2A-2B with voxels classified as normal, healthy lung parenchyma (FIG. 3A), voxels classified as fSAD (FIG. 3B), and voxels classified as emphysema.

Figure 4:
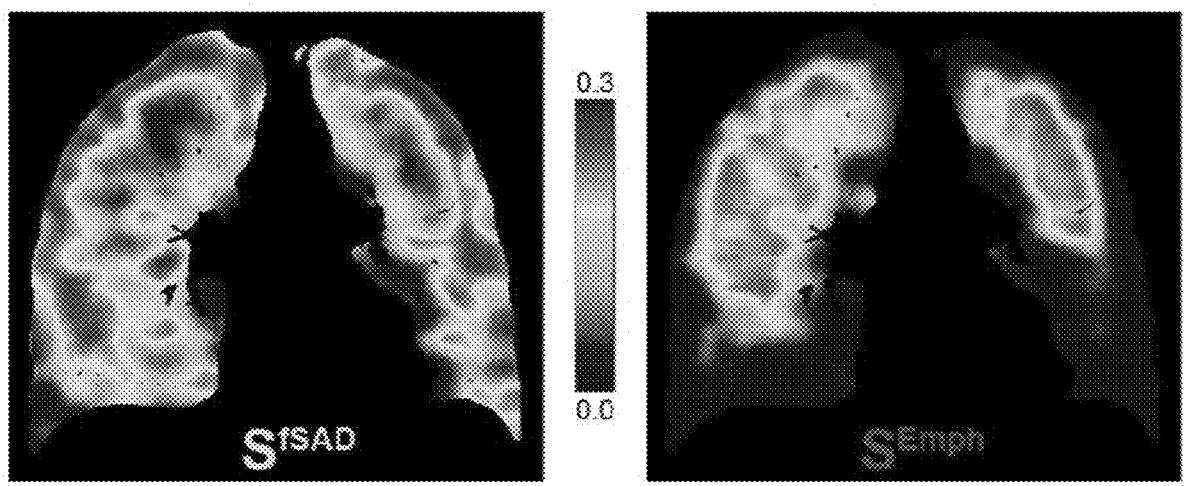
FIG. 4 is an example of the topographical feature analysis of at least one of the parametric response maps shown in FIGS. 3A-3C, according to the exemplary method of FIG. 1.

A topographical feature analysis may then be performed for the PCM or PRM using at least one topographical feature, such as surface area (S). At least four parameters that represent different topological features of PRM classification maps can be analyzed with the methods of the present invention: surface area (S), mean curvature length (B), the Euler-Poincare characteristic ($\chi$), and a condensed descriptor of aggregation ($\alpha$). These parameters may be determined locally, over sub-volumes of the lung resulting in a parameter map, or globally, over the entire lung volume resulting in a parameter scalar quantity. In some embodiments, S may be preferred due to its high correlation with clinical measures and its stability between local and global evaluations. This measure is indicative of distribution heterogeneity, with higher values indicating a more diffuse disease and lower values indicating a more clustered pattern. Topological properties of each PRM classification map may explored as independent indicators of clinical outcome. These topological properties may be defined through the Minkowski measures associated with 3D distributions: Volume (V, in $mm^3$), Surface Area (S, in $mm^2$), Mean Breadth (B, in mm), and the Euler-Poincaré statistic ($\chi$). Additional processing with use of the $\chi$ statistic may produce a condensed descriptor of aggregation, $\alpha$. Maps of Minkowski measures (i.e. V, S, B, $\chi$ and $\alpha$) may, in one embodiment, be computed using a moving window evaluated on a grid with 4-voxel spacing. Local values from each parameter may be normalized to produce parametric densities, with V, S, and B normalized by the masked local window volume and $\chi$ and $\alpha$ normalized by the masked window voxel count. In some embodiments, for display purposes, the Minkowski measures (S, B, $\chi$ and $\alpha$) may be multiplied by the local density, V, to highlight regions of substantial disease. Final displayed representations of spatially resolved indices may, in some embodiments, be linearly interpolated back to original dimensions. In addition, global values for V, S, B, $\chi$ and $\alpha$ may be calculated for each PRM classification over the entire lung volume. The ability of multiple volume fractions to translate to the same topological measure could be an important factor in the use of individual measures to provide meaningful results. FIG. 4 shows an example of the analysis performed for the topographical feature S for a COPD patient. As a result of this analysis on COPD patients, it was determined that information on disease pattern is independent of disease extent, demonstrating that fSAD features as defined by PRM are key disease characteristics that are strongly correlated with clinical outcome measures.

Figure 5A:
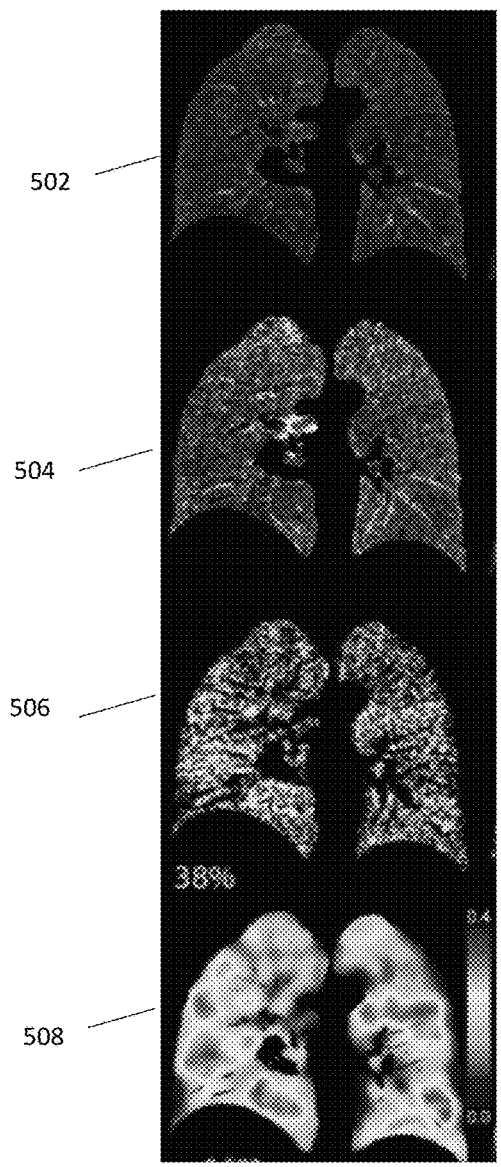
FIGS. 5A-5B are examples of images and parametric response maps for two patients, in accordance with at least one embodiment of the present disclosure.
Figure 5B:
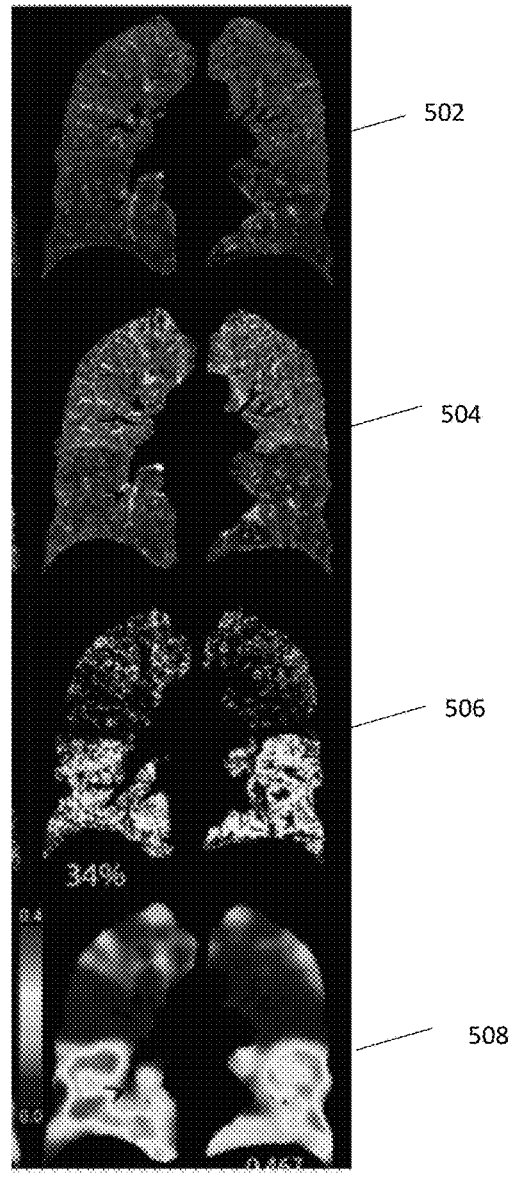
Figure 6A:
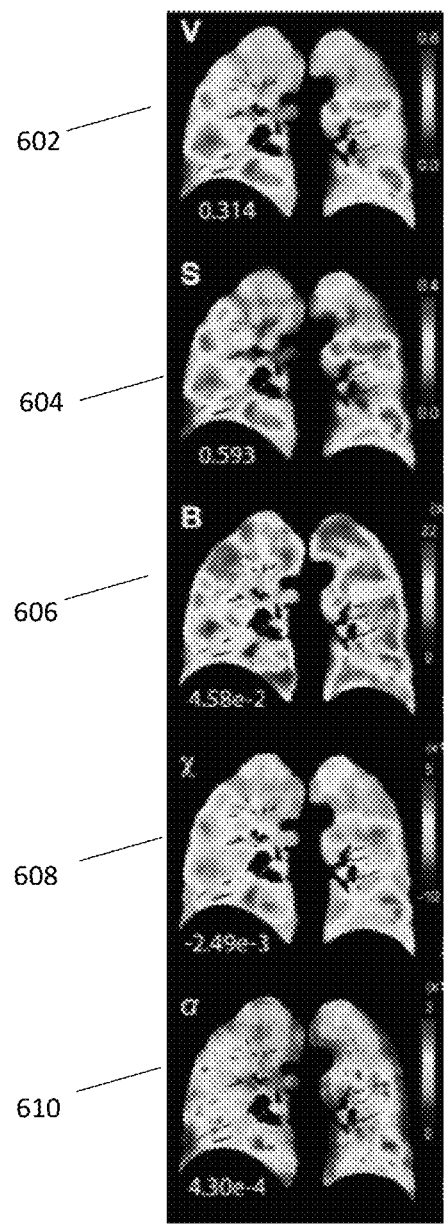
FIGS. 6A-6B are examples of topographical feature analysis of parametric response maps for the two patients shown in FIGS. 5A-5B, in accordance with at least one embodiment of the present disclosure.
Figure 6B:
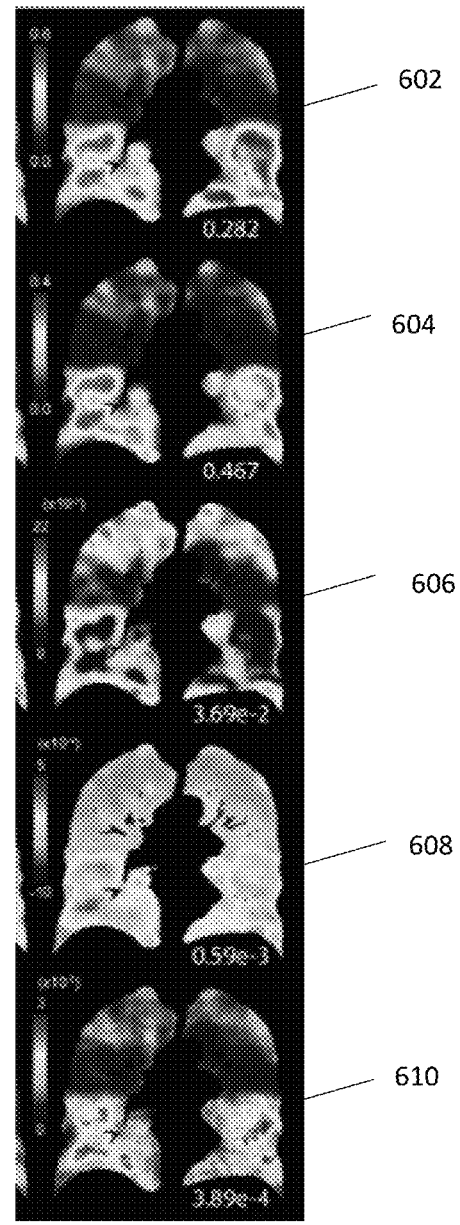

The systems and methods of the present disclosure are advantageous because of their ability to delineate disease pattern that resides within the PRM classification maps independent of the extent of disease (i.e. $PRM^{fSAD}$). For example, the pattern of fSAD, using the systems and methods in the present disclosure for extraction of topological features from PRM classification maps, is strongly correlated with clinical readouts even when considering the overall extent of the disease (i.e. PRM). FIGS. 5A-5B show examples of medical images and PRM for one patient with diffuse disease (FIG. 5A) and one patient with aggregated disease (FIG. 5B). Each of FIG. 5A-5B shows a first medical image 502 during inspiration, a second medical image 504 during expiration, a PRM 506 with voxels classified as fSAD, and a PRM 508 with a topographical feature analysis performed using S for each of the patients. Although the two patients in FIGS. 5A-5B had near identical spirometry readouts, the PRMs 506, 508 display differing spatial distributions. As shown in FIGS. 6A-6B, spatial maps of all topological measures were generated for the two representative cases shown in FIG. 5. FIGS. 6A-6B each show a PRM 602 displaying a topographical feature analysis for measure V, a PRM 604 displaying a topographical feature analysis for measure S, a PRM 606 displaying a topographical feature analysis for measure B, a PRM 608 displaying a topographical feature analysis for measure x, and a PRM 610 displaying a topographical feature analysis for measure a. The PRMs displayed in FIGS. 6A-6B may be multiplied by local relative volumes to highlight regions of interest, where fSAD may be prevalent. As shown in FIGS. 6A-6B, clear differences in the spatial pattern of each measure are apparent between subjects, revealing signatures of disease distribution that may be clinically relevant.

While some embodiments of the present disclosure have been described with respect to CT imaging of lung tissue for COPD patients and spatial characteristics of COPD phenotypes, it is to be appreciated that the systems and methods of the present disclosure may be applicable and beneficial with respect to a variety of imaging modalities, tissue regions, diseases or conditions, and clinical settings. That is, systems and methods of the present disclosure may provide an analysis of spatial characteristics with respect to any suitable PRM or PCM-derived component classification map of any suitable tissue region. For example, a PRM classification map of brain tissue, showing for example the progression of a brain tumor, may be analyzed similar to the above described examples in order to obtain spatial characteristic data for the brain tissue. Systems and methods of the present disclosure may reveal unique spatial patterns of disease or tumor progression, for example, as an indicator of a meaningful clinical measure.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

We claim:

1. A computer-implemented method of analyzing a medical image to assess the state of the sample region, the method comprising:
   receiving a medical image collected previously from an image source, the medical image comprising a plurality of voxels, each characterized by a signal value;
   classifying the signal value of each voxel as representing one of a first disease state or a second disease state by comparing the signal value to a threshold value; and
   performing a topographical feature analysis on at least one of a first set of voxels representing the first disease state and a second set of voxels representing the second disease state.

2. The method of claim 1, wherein the medical image is a phasic classification map.

3. The method of claim 1, wherein the medical image is a parametric response map.

4. The method of claim 1, wherein the medical image is kinetic parameter map.

5. The method of claim 1, wherein the medical image is a diffusion image, a perfusion image, a permeability image, a normalized image, a spectroscopic image, and a quantified image.

6. The method of claim 1, wherein the image source is selected from the group consisting of magnetic resonance imaging, computed tomography, positron emission tomography, ultrasound, single-photon emission computed tomography, and two-dimensional planar x-ray.

7. The method of claim 1, wherein the topographical feature is selected from the group consisting of surface area, mean curvature length, the Euler-Poincare characteristic, and a condensed descriptor of aggregation.

8. A computer-implemented method of analyzing a sample region of lung tissue to determine the condition of the sample region, the method comprising:
   receiving, using a medical imaging device, a first image data set of the sample region during inspiration, the first image data set comprising a first plurality of voxels each characterized by a signal value;
   receiving, using the medical imaging device, a second image data set of the sample region during expiration, the second image data set comprising a second plurality of voxels each characterized by a signal value;
   deformably registering the first image data set and the second image data set to produce a co-registered image data set that comprises a plurality of co-registered voxels, wherein each of the co-registered voxels includes the signal value of the voxel associated with the first image data set, and the signal value of the voxel associated with the second image data set;
   performing a first threshold analysis on the co-registered voxels to identify a first set of co-registered voxels indicating a first disease state;
   performing a second threshold analysis on the co-registered voxels to identify a second set of co-registered voxels indicating a second disease state; and
   performing a topographical feature analysis on at least one of the first set of co-registered voxels and the second set of co-registered voxels.

9. The method of claim 8, wherein the first set of co-registered voxels comprises co-registered voxels with an inspiration signal value of greater than a threshold value, indicating the absence of emphysematous tissue, and an expiration signal value of less than a threshold value, indicating the presence of air-trapping.

10. The method of claim 9, wherein the second set of co-registered voxels comprises co-registered voxels with an inspiration signal value of less than a threshold value, indicating the presence of emphysematous tissue, and an expiration signal value of greater than a threshold value, indicating the absence of air-trapping.

11. The method of claim 10, wherein the topographical feature analysis quantifies at least one feature selected from the group consisting of surface area, mean curvature length, the Euler-Poincare characteristic, and a condensed descriptor of aggregation.

12. The method of claim 8, wherein the topographical feature analysis quantifies at least one feature selected from the group consisting of surface area, mean curvature length, the Euler-Poincare characteristic, and a condensed descriptor of aggregation.

13. The method of claim 8, wherein the medical image device is selected from the group consisting of a magnetic resonance imaging device, computed tomography device, positron emission tomography device, ultrasound device, single-photon emission computed tomography device, and two-dimensional planar x-ray device.

14. A computer-based method for analyzing a parametric response map comprising:
receiving a first set of parametric measurement data for a tissue region, the first set of parametric measurement data comprising a plurality of voxels;
receiving a subsequent set of parametric measurement data for the tissue region, the subsequent set of parametric measurement data comprising a plurality of voxels;
deformably registering the subsequent set of parametric measurement data with the first set of parametric response data;
identifying the voxels within the tissue region, on a voxel-by-voxel basis, by at least one classification based on a change in parametric measurement data, using a defined threshold for each classification, wherein each of the changes is determined by comparing voxels of the subsequent set of parametric measurement data to the voxels of the first set of parametric measurement data; and
performing at least one topographical feature analysis of the voxels for at least one of the classifications.

15. The method of claim 14, wherein the topographical feature analysis quantifies at least one voxel based on surface area.

16. The method of claim 14, wherein the topographical feature analysis quantifies at least one voxel based on mean curvature length.

17. The method of claim 14, wherein the topographical feature analysis quantifies at least one voxel based on the Euler-Poincare characteristic.

18. The method of claim 14, wherein the topographical feature analysis quantifies at least one voxel based on a condensed descriptor of aggregation.

19. The method of claim 14, wherein the parametric measurement data is displayed as a phasic classification map, a parametric response map, a kinetic parameter map, a diffusion image, a perfusion image, a permeability image, a normalized image, a spectroscopic image, and a quantified image.

20. The method of claim 14, wherein the parametric measurement data is retrieved from a medical image selected from the group consisting of a diffusion image, a perfusion image, a permeability image, a normalized image, a spectroscopic image, a kinetic parameter map, a quantified image, a parametric response map, and a phasic classification map.

* * * * *